United States Patent Office 3,825,491
Patented July 23, 1974

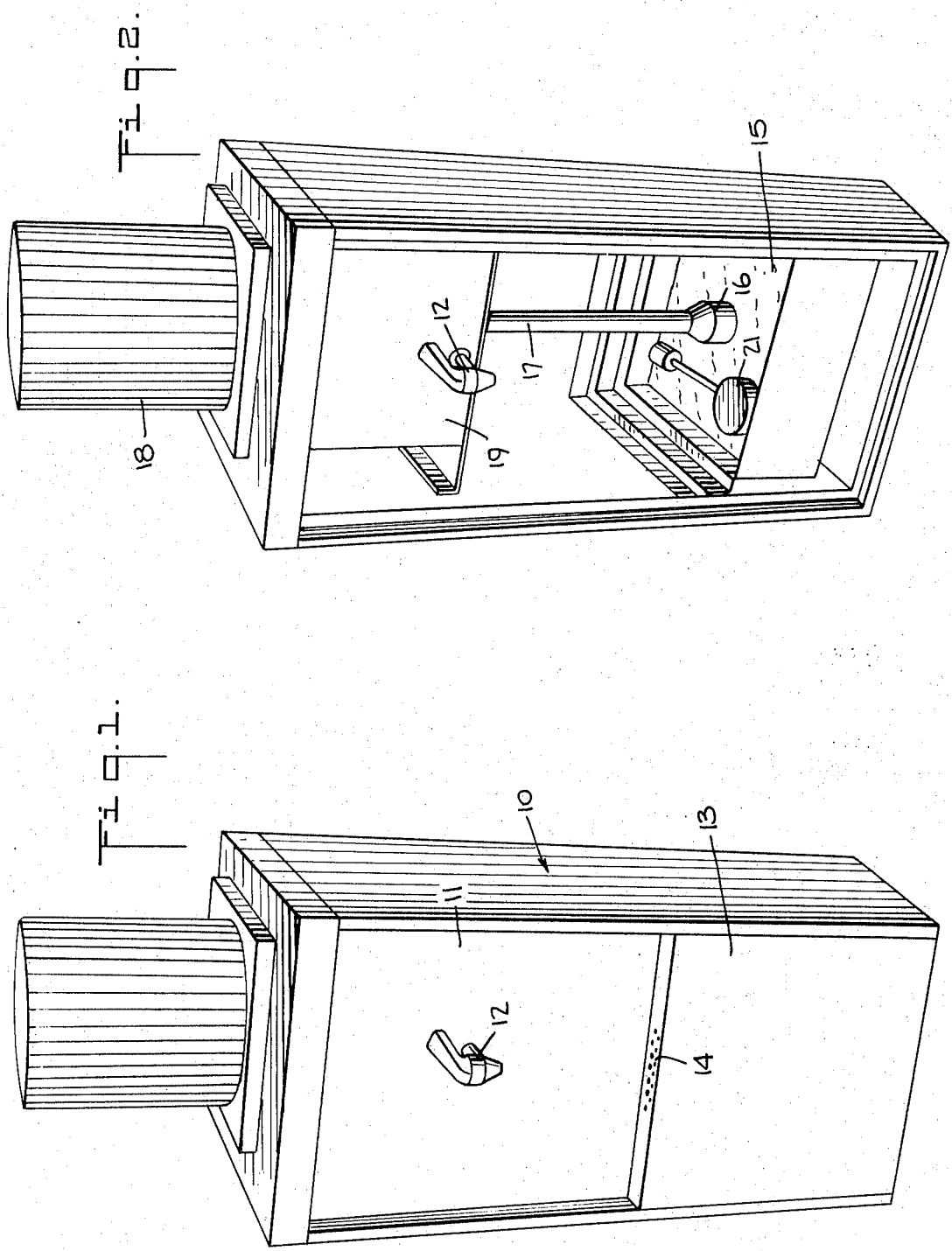

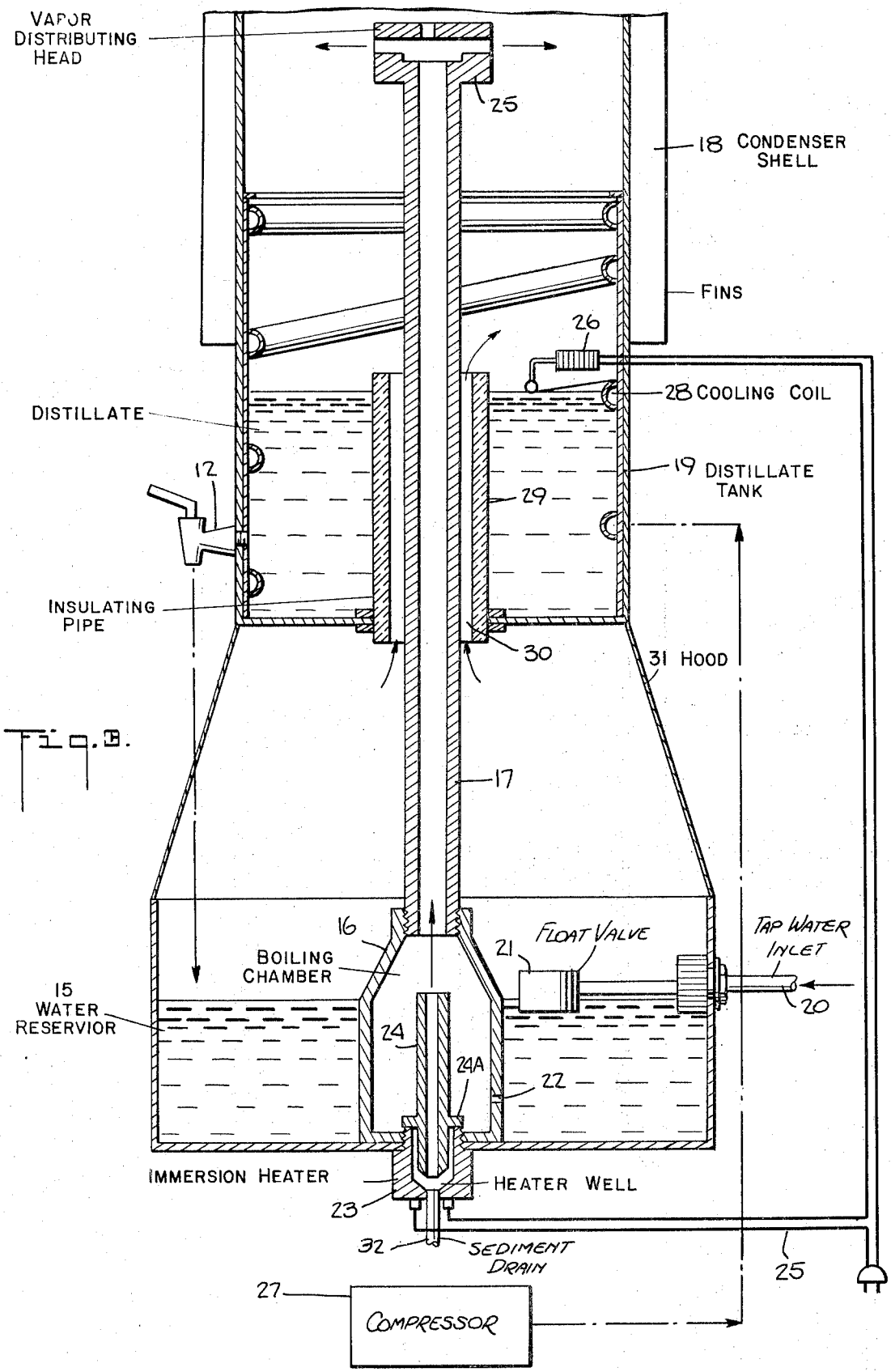

3,825,491
WATER DISTILLER AND COOLER UNIT
Gil C. Sanchez, 2915 Miles Ave., Bronx, N.Y. 10465
Filed July 14, 1972, Ser. No. 271,732
Int. Cl. B01d 3/00, 3/42
U.S. Cl. 202—176                                      9 Claims

ABSTRACT OF THE DISCLOSURE

A water distiller and cooler unit adapted to be coupled to a water line or other source yielding water of relatively poor quality, the unit producing a supply of chilled, distilled water of high purity and neutral taste. The unit is constituted by a water reservoir coupled to the water line and including a boiling chamber having a heater therein, the water being admitted into the chamber at a rate determined by the capacity of the heater to volatilize water. The steam generated in the boiling chamber is fed to a condenser shell mounted above a distillate tank which is provided with a spigot, the distillate falling into the tank. The unit also includes a mechanical refrigerator system whose cooling coils are disposed partly in the condenser shell and partly in the distillate tank, the coils serving to promote condensation and to chill the resultant distillate.

BACKGROUND OF THE INVENTION

This invention relates generally to the distillation and cooling of drinking water to enhance its potability and taste, and more particularly, to a water distiller and cooler unit which may be coupled to a tap water line to produce a supply of cooled, distilled water of high purity and neutral taste.

Modern water supply systems collect water from ground or surface sources and conduct the water to a treatment plant. Chlorination is the most effective hygienic measure thus far devised, for in relatively small concentrations it destroys large numbers of pathogenic bacteria, protozoa and viruses. Other purification operations entail chemical coagulation and semimentation, these being usually followed by filtration through granular material. Hard water may be softened by lime, and soda ash may be added to reduce the corrosiveness of water on metal piping.

The increasing pollution of water sources has dictated heavier chlorination and chemical treatment, but even then, drinking water available at taps is not always sterile. This is particularly true in those instances where, because of water shortage, it becomes necessary to draw water from polluted rivers. As a consequence, tap water in many areas, as in Paris and Mexico City, is not entirely safe for drinking purposes, and even when the water is hygienically acceptable, its taste is often unpleasant because of chemical constituents contained therein as a result of heavy treatment.

Since tap water is generally used in brewing tea and coffee, as well as for diluting fruit juices and for cooking purposes, the poor taste of many beverages and foods prepared with ordinary tap water is often imputable to the low quality of the available water. A common solution to this problem is to make use of bottled spring water, which is free of chemical constituents.

But bottled water is relatively expensive and presents storage and handling problems. For example, water coolers are commercially available which make use of bottled spring water. To maintain this cooler in operation, one must have storage facilities for several large bottles, so that when a bottle is exhausted one may replace it with a fresh bottle. Since the bottles are heavy and cumbersome, the maintenance of a bottled-water cooler involves obvious practical difficulties. Nevertheless, sales of bottled water have increased enormously in recent years, to the point where bottled water costs represent a significant item in many household and office budgets.

Another approach has been to install filtration systems in household water supply lines, and here too, the solution is not only expensive, but it necessitates the periodic replacement of contaminated filtration components.

SUMMARY OF THE INVENTION

In view of the foregoing, it is the main object of this invention to provide a water distiller and cooler unit adapted to volatilize tap water or any other source of relatively poor quality water, to produce a supply of chilled, distilled water of high purity purity and neutral taste.

An important advantage of the invention is that the water produced by the unit is not only of improved potability, but when used for cooking and the making of beverages, the neutral taste thereof avoids impairment of the natural flavor of the food product. In the case of coffee, for example, a high-grade coffee bean brewed with ordinary tap water may result in a poor-quality beverage, whereas when using pure water of neutral taste, a superior beverage is produced.

A significant feature of the unit in accordance with the invention is that it acts to maintain a substantial supply of cooled, distilled water, whereby when water is drawn from the supply, the supply is quickly replenished.

More particularly, it is an object of the invention to provide a highly compact water distiller and cooler unit which requires no installation other than an electrical power connection and flexible piping to a water line. No water drain or other plumbing is necessary. Hence the unit may be installed at any convenient site within a limited space.

Also an object of the invention is to provide a food-storage refrigerator which incorporates a pure water supply unit, the pure water being available for making ice cubes as well as for drinking, dilution and cooking purposes. Ice cubes made from pure water are superior to those made from tap water, for the former do not unpleasantly flavor the liquors with which they are used.

Yet another object of the invention is to provide a unit of the above-noted type, which may be manufactured and sold at low cost, and which operates economically and efficiently to furnish potable water of neutral taste.

Briefly stated, these objects are accomplished in a unit having a water reservoir which is coupled to a water line, water from the reservoir being admitted slowly into a boiling chamber disposed therein. Mounted in the chamber is a heater which volatilizes the water fed therein to generate steam which is conducted by a steam pipe extending vertically from the chamber to a vapor distribution head. The vapor emitted by the head is discharged into a condenser shell mounted above a distillate tank provided with a spigot. A mechanical refrigeration unit is provided, the cooling coils of which are disposed partly within the condenser shell and partly within the distillate tank to promote condensation as well as to chill the distilled water. The rate at which water is fed into the boiler chamber relative to the capacity of the heater is such that the water is quickly volatilized, so that not long after the unit is put into operation, a supply of pure water is available.

OUTLINE OF THE DRAWING

For a better understanding of the invention as well as other objects and further features thereof, reference is made to the following detailed describtion to be read in conjunction with the accompanying drawing, wherein:

FIG. 1 is a perspective view of a water distiller and cooler unit in accordance with the invention;

FIG. 2 shows the same unit, but with the front panel removed to show the internal construction; and FIG. 3 is a sectional view, partly schematic, of the components forming the unit.

DESCRIPTION OF THE INVENTION

Referring now to FIGS. 1 and 2, there is shown a preferred embodiment of a water distiller and cooler unit in accordance with the invention. The unit is housed in a cabinet 10 whose front panel is constituted by an upper section 11 from which a spigot 12 projects, and a lower section 13. The upper panel section 12 is recessed relative to the lower section to define a drain shoulder 14 whereby spillage from spigot 12 passes through drain shoulder 14 into a water reservoir 15 for recycling, thereby avoiding the need for a water drain line.

The water to be processed is stored in reservoir 15 and is converted into steam in a boiling chamber 16 disposed in the center of the reservoir. The steam is conducted by a steam pipe 17 extending vertically from the chamber to a vapor distribution head (to be later described) disposed within a condenser shell 18 mounted on top of cabinet 10. The vapor is condensed therein to provide a supply of distilled water in the distillate tank 19 to which spigot 12 is coupled.

FIGS. 1 and 2 show the physical arrangement of parts in the unit. Reference is now made to FIG. 3 for a more detailed illustration of the operating components of the system. Water from a supply line or any other source in need of purification is fed into resorvoir 15 through an inlet pipe 20. In practice, this pape may be in the form of flexible plastic tubing that may run across walls in the same fashion as a telephone cable. Since this is the only plumbing involved, this unit may be installed without difficulty at any convenient site.

A float valve arrangement 21 is provided to govern the level of the water in reservoir 15, so that input flow is arrested only when a predetermined level is reached, and is resumed when the water falls below the desired level. Water from reservoir 15 is admitted to the boiling chamber 16 through a small port 22 so that the water trickles therein.

A well-type of immersion heater 23 is provided at the bottom of boiling chamber 16, the heater cooperating with a hollow stem 24 coaxially mounted with respect to the heater. Heater 23 is electrically energized through a power line 25. It will be appreciated that while an electrical heater is shown, in practice a gas or other type of heater may be employed to volatilize the water fed into the boiling chamber.

A water passage is formed between flange 24A of the hollow stem 24 and the heater 23, the water received in the heater well being quickly volatilized to produce vapor which is conducted by steam pipe 17 to a vapor-distributor head 25 positioned within condenser shell 18. Head 25 is provided with lateral openings to disperse the vapor within the shell. The shell is provided with external radiating fins to dissipate heat quickly.

The resultant condensate is collected in distillate tank 19, which is provided with a float switch 26 adapted to cut off power to heater 23 when a predetermined level of distilled water is attained. In this way, the heater remains operative until an adequate supply of distilled water is produced, at which point the heater is de-energized. When water is drawn from the distillate tank, causing the level therein to fall, the float switch 26 operates to again energize the heater for a period sufficient to replenish the supply.

Also provided is a standard mechanical refrigeration sytem including a sealed compressor 27 which is mounted below the water reservoir and is thermostatically operated. The compressor is coupled to a cooling coil 28 which is wound along the inner wall of distillate tank 19, the upper portion of the coil extending into condenser shell 18. The cooling coil, therefore, is partly in the condenser shell and partly in the distillate tank and acts not only to chill the distilled water in the tank, but also to promote the condensation of the vapor discharged into the condenser shell.

Steam pipe 17 passes concentrically through an insulating pipe 29 centrally mounted in distillate tank 19 to define an annular passage 30 therebetween. A hood 31 is provided between the upper end of reservoir 15 and the lower end of tank 19, whereby vapor emitted from the reservoir as a result of the heating of the water therein, passes through passage 30 into the condenser shell to be condensed therein. The water in the reservoir is heated from the exterior of the immersion heater, whose interior well heats the water within the boiling chamber.

In practice, a timer or thermostat may be installed in the condensing chamber so that the hot vapor acting on the cooling coils will not place too great a demand on the cooling compressor. At the bottom of the heater, a drain pipe 32 is provided so that salts and other concentrated deposits can be removed simply by turning a valve to flush the heater.

Thus the water being treated, which contains chemicals used in purification, as well as natural minerals and contaminants, all of which affect the taste and quality of the water, is converted to pure water altogetther free of chemicals and contaminants and having a neutral taste. This pure water is not only useful for food and beverage preparation, but may be used for washing purposes, particularly in those cases where the ordinary water is hard or contains constituents producing an allergenic reaction.

The combination of a distiller and water cooler, as discussed above, may be incorporated into a standard refrigerator for food storage, particularly of the self-defrosting type. By using the water allowed to evaporate in a self-defrosting refrigerator and processing it in a manner similar to the distiller disclosed previously, chilled, distilled water can be made available as part of a standard refrigerator. By piping tap water into the modified refrigerator, it is then able to supply all of the water required for ice cubes, drinking and cooking.

While there has been shown and described a preferred embodiment of water distiller and cooler unit in accordance with the invention, it will be appreciated that many changes and modifications may be made therein without, however, departing from the essential spirit of the invention.

I claim:

1. A water distiller and cooler unit comprising:
   (A) a reservoir for storing water obtainable from a water line or any other source of water of relatively poor quality,
   (B) a boiling chamber disposed in said reservoir, the wall of said chamber being surrounded by said water, said chamber having an electrically-energized heating element therein and a port in said wall passing water from said reservoir to said element, said port having an opening dimensioned to admit water into said chamber at a rate within the capacity of the element to volatilize the incoming water to produce steam,
   (C) a condenser shell,
   (D) a distillate tank disposed in the lower part of said shell to collect condensed steam and to provide a supply of purified water of neutral taste, said tank having a float-actuated switch disposed therein to provide a power connection to said heating element only when the level of purified water in said tank falls below a predetermined value,
   (E) means to conduct steam from said boiling chamber to said shell, and
   (F) a mechanical refrigeration system including a compressor operatively coupled to cooling coils disposed partly in said shell and partly in said tank to promote condensation and to chill the resultant condensate collected in said distillate tank.

2. A unit as set forth in claim 1, further including a float valve in the inlet to said reservoir, said valve being arranged to maintain the water therein at a predetermined level.

3. A unit as set forth in claim 1, wherein said reservoir is disposed below said tank, and wherein said means to conduct steam from the boiling chamber to said condenser shell is constituted by a steam pipe passing vertically through said tank and terminating in a vapor distribution head.

4. A unit as set forth in claim 1, wherein said condenser shell is provided with radiating fins.

5. A unit as set forth in claim 1, further including a spigot coupled to said tank to permit the removal of purified water therefrom.

6. A unit as set forth in claim 1, wherein said compressor is disposed below said reservoir.

7. A unit as set forth in claim 1, wherein said heating element is of the immersion-well type, the water through the port being admitted into the well of the heater.

8. A unit as set forth in claim 7, wherein the exterior of said heating element is in contact with the water in the reservoir to heat same, and means to conduct vapors from said heater reservoir to said condenser shell.

9. A unit as set forth in claim 8, further including an insulation pipe mounted in said tank, said steam pipe extending coaxially through said insulation pipe to define an annular passage to conduct the vapors from said heated reservoir to said condenser shell.

References Cited

UNITED STATES PATENTS

| | | | |
|---|---|---|---|
| 633,851 | 9/1899 | Kemp | 202—206 |
| 3,055,810 | 9/1962 | Skow | 203—2 |
| 932,950 | 8/1909 | Behrens | 202—192 |
| 1,465,020 | 8/1923 | Monti | 159—24 A |
| 403,638 | 5/1889 | Bracher | 202—189 |
| 468,913 | 2/1892 | Hunting | 202—165 |
| 1,778,926 | 10/1930 | Wiegand | 417—208 X |
| 1,864,021 | 6/1932 | Jack | 202—181 |
| 2,475,482 | 7/1949 | Clemens | 202—194 |
| 3,278,395 | 10/1966 | Rubinowitz | 203—10 X |

JACK SOFER, Primary Examiner

U.S. Cl. X.R.

202—181, 187, 189, 206; 219—273